(12) United States Patent
Geisert et al.

(10) Patent No.: US 9,013,403 B2
(45) Date of Patent: Apr. 21, 2015

(54) REMOTE CONTROLLING OF MOUSE CURSOR FUNCTIONS OF A COMPUTER DEVICE

(75) Inventors: Franziska Geisert, Stuttgart (DE); Jakob C. Lang, Stuttgart (DE); Andreas O. Loesche, Sindelfingen (DE); Florian Schaefer, Dielheim (DE)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 13/523,999

(22) Filed: Jun. 15, 2012

(65) Prior Publication Data

US 2012/0326979 A1 Dec. 27, 2012

(30) Foreign Application Priority Data

Jun. 21, 2011 (EP) .................................. 11170648

(51) Int. Cl.
*G06F 3/033* (2013.01)
*G06F 3/0346* (2013.01)

(52) U.S. Cl.
CPC .................................. *G06F 3/0346* (2013.01)

(58) Field of Classification Search
CPC . G06F 3/0346; G06F 3/0383; G06F 3/04842; G06F 3/014; G06F 3/011; G06F 1/1684; G06F 3/033; G06F 3/038; G06F 7/62; G06F 7/68; G06F 1/1626; G06F 3/0231; H04L 67/28; H04L 67/2842; H04L 67/289; H04W 12/06
USPC .................................................. 345/156–158
See application file for complete search history.

(56) References Cited

U.S. PATENT DOCUMENTS 5,963,194 A * 10/1999 Umeda et al. ................. 345/157
5,999,167 A * 12/1999 Marsh et al. .................. 345/158
(Continued)

FOREIGN PATENT DOCUMENTS

EP   2249332 A1   10/2010

OTHER PUBLICATIONS

McArther et al., "An Empirical Comparison of "Wiimote" Gun Attachments for Pointing Tasks", Department of Computer Science & Engineering, York University, Ontario, Canada, (pp. 203-208) (Jul. 15-17, 2009).

(Continued)

*Primary Examiner* — Vijay Shankar
*Assistant Examiner* — Sanjiv D Patel
(74) *Attorney, Agent, or Firm* — Steven Chiu, Esq.; Kevin P. Radigan, Esq.; Heslin Rothenberg Farley & Mesiti P.C.

(57) ABSTRACT

A method is provided for remote controlling of mouse cursor functions of a computer device is disclosed. The method includes: tracking movement of a handheld pointing device in a three dimensional monitoring space based on a directional carrier sent by the handheld pointing device; modulating the directional carrier with a pulse pattern based on a corresponding manual operation action at the handheld pointing device; converting the tracked movement of the handheld pointing device in corresponding movement information; converting the movement information of the handheld pointing device in valid desktop coordinates for the computer device and moving a mouse cursor to these coordinates; demodulating the directional carrier and evaluating the pulse pattern in order to determine a corresponding manual operating action at the handheld pointing device; and taking corresponding action if a defined manual operating action at the handheld pointing device is determined.

14 Claims, 4 Drawing Sheets

(56) References Cited

U.S. PATENT DOCUMENTS

| | | | |
|---|---|---|---|
| 6,704,000 B2 | 3/2004 | Carpenter | |
| 7,439,958 B2 | 10/2008 | Yoon | |
| 7,683,881 B2 | 3/2010 | Sun et al. | |
| 8,525,786 B1* | 9/2013 | Henty et al. | 345/158 |
| 2004/0075642 A1* | 4/2004 | Kisliakov | 345/156 |
| 2008/0001951 A1* | 1/2008 | Marks et al. | 345/474 |
| 2008/0080789 A1* | 4/2008 | Marks et al. | 382/296 |
| 2008/0100825 A1* | 5/2008 | Zalewski | 356/29 |
| 2008/0120448 A1 | 5/2008 | Shi et al. | |
| 2008/0143676 A1* | 6/2008 | Choi et al. | 345/158 |
| 2008/0170032 A1* | 7/2008 | Raynor | 345/156 |
| 2009/0322680 A1* | 12/2009 | Festa | 345/160 |
| 2010/0060567 A1 | 3/2010 | Larsen | |
| 2011/0169734 A1* | 7/2011 | Cho et al. | 345/157 |

OTHER PUBLICATIONS

Chow, Yang-Wai, "Low-Cost Multiple Degrees-of-Freedom Optical Tracking for 3D Interaction in Head-Mounted Display Virtual Reality", International Journal of Recent Trends in Engineering, Issue 1, vol. 1, pp. 52-56 (May 2009).

* cited by examiner

REMOTE CONTROLLING OF MOUSE CURSOR FUNCTIONS OF A COMPUTER DEVICE

PRIOR FOREIGN APPLICATION

This application claims priority from European patent application number 11170648.7, filed Jun. 21, 2011, which is hereby incorporated herein by reference in its entirety.

TECHNICAL FIELD

The present invention relates in general to the field of remote operation of computer systems, and in particular to a method for remote controlling of mouse cursor functions of a computer device, and a system for remote controlling of mouse cursor functions of a computer device. Still more particularly, the present invention relates to a data processing program and a computer program product for remote controlling of mouse cursor functions of a computer device.

BACKGROUND

There are several approaches known in the art for using an infrared camera in order to track a pointing device like a light emitting pen for whiteboard purposes. These approaches offer a calibration after which the pointing device can be used for drawing on a whiteboard application. Only drag-and-drop actions are available in these applications, and a computer mouse can only be controlled in a two-dimensional space on the projected surface. Free movement of the corresponding mouse cursor without dragging as well as being able to stand away from the screen is not yet implemented in such approaches.

A potential usage of such a pointing is during remote presentations. The speaker cannot use a laser pointer for pointing, because it is not visible to the remote listeners. A mouse pointer can be used for pointing, but, requiring a computer mouse, it is quite uncomfortable for free speaking.

In the Patent Publication U.S. Pat. No. 7,683,881 B2 "VISUAL INPUT POINTING DEVICE FOR INTERACTIVE DISPLAY SYSTEM" by Sun et al. an interactive presentation system using a presentation computer, a computer controlled image projector and a projection screen is disclosed in which control of the presentation computer is accomplished by using a wireless optical pointer that projects an encoded control cursor onto the projection screen. The projected screen images are monitored by a video camera, and the control cursor is scanned, detected and decoded for emulation various keyboard commands and/or pointing device (mouse, touch pad, track ball) position-dependent cursor operations, e.g., select, move, left click, right click and double click. The control cursor is characterized by one or more primary attributes, for example image intensity or image repetition (blink) rate, that are independent of projection angle limitations as well the attributes of projected background images and objects. The control cursor is also characterized by one or more secondary attributes, for example pixel area (image size), colour, or pattern (image shape), that correspond with specific computer commands. Preferably, the image properties of the primary attributes and secondary attributes are mutually exclusive with respect to each other, respectively, thus allowing cursor-related processing operations to be performed conditionally and independently. The interactive image projection and display systems use technologies including ultrasonic, infrared and radio frequency (RF) techniques to provide increased user mobility relative to the computer processor and/or display screen. These technologies typically employ a transmitter and receiver to communicate control and status information between the operator and the computer.

In the Patent Publication U.S. Pat. No. 6,704,000 B2 "METHOD FOR REMOTE COMPUTER OPERATION VIA A WIRELESS OPTICAL DEVICE" by Carpenter, a method for remote operation of a computer having a cursor, via a wireless optical device is disclosed. The disclosed method comprises projecting a computer output display onto projection surface via a projecting means, generating an optical point on a desired cursor position on the projected image via the wireless optical device, capturing the image and optical point and transmitting this data to the computer, positioning the cursor on the projected image within a predefined distance of the position of the optical point, measuring a dwell time and executing a computer command when the dwell time exceeds predefined length of time. The executed computer commands may comprise any of a single left-mouse-click, double left-mouse-click, right-mouse-click, a mouse command, or a keyboard command.

State of the art embodiments are used to project an image on a projected surface and to recognize/interpret this pattern. Thereby, not the movement of the pointing device but the movement of the image on-screen is relevant.

BRIEF SUMMARY

In accordance with an aspect of the present invention, a method for remote controlling of mouse cursor functions of a computer device is provided. The method includes: tracking movement of a handheld point device in a three-dimensional monitoring space based on a directional carrier sent by the handheld pointing device; modulating the directional carrier with a pulse pattern based on a corresponding manual operation action at the handheld pointing device; converting the tracked movement of the hand-held pointing device in corresponding movement information; converting the movement information of the handheld pointing device in valid desktop coordinates for the computer device and moving a mouse cursor to these coordinates; demodulating the directional carrier and evaluating the pulse pattern in order to determine a corresponding manual operating action at the handheld pointing device; and taking corresponding action if a defined manual operating action at the handheld point device is determined.

In another aspect, a system for remote controlling of mouse cursor functions of a computer device is provided. The system includes: a handheld pointing device comprising at least one button, at least one transmitting device, and a first controller; a locating device comprising at least one receiving device, and a second controller; and a computer comprising a third controller and a graphical display; wherein the locating device is tracking movement of the handheld point device in a three-dimensional monitoring space based on a directional carrier sent by the at least one transmitting device of the handheld pointing device; wherein the first controller modulates the directional carrier with a pulse pattern based on a corresponding manual operation action at the handheld pointing device; wherein the second controller converts the tracked movement of the handheld pointing device in corresponding movement information, which are converted in valid desktop coordinates for the computer device, demodulates the directional carrier and evaluates the pulse pattern in order to determine a corresponding manual operating action at the handheld pointing device; and wherein the third controller moves a mouse cursor on the graphical display based on the valid desktop coordinates and takes corresponding action if a defined manual operating action at the handheld pointing device is determined.

In a further aspect, a computer program product for remote controlling of mouse cursor functions of a computer system is provided. The computer program product includes a computer-readable storage medium readable by a processor and storing instructions for execution by the processor for performing a method. The method includes: tracking movement of a handheld point device in a three-dimensional monitoring space based on a directional carrier sent by the handheld pointing device; modulating the directional carrier with a pulse pattern based on a corresponding manual operation action at the handheld pointing device; converting the tracked movement of the hand-held pointing device in corresponding movement information; converting the movement information of the handheld pointing device in valid desktop coordinates for the computer device and moving a mouse cursor to these coordinates; demodulating the directional carrier and evaluating the pulse pattern in order to determine a corresponding manual operating action at the handheld pointing device; and taking corresponding action if a defined manual operating action at the handheld point device is determined.

The above, as well as additional purposes, features, and advantages of the present invention will become apparent in the following detailed written description.

BRIEF DESCRIPTION OF THE SEVERAL VIEWS OF THE DRAWINGS

One or more embodiments of the present invention, as described in detail below, are shown in the drawings, in which.

DETAILED DESCRIPTION

The technical problem underlying the present invention is to provide a method for remote controlling of mouse cursor functions of a computer device and a system for remote controlling of mouse cursor functions of a computer device, which are able to allow a user to stand freely in the room and control all mouse features with one hand; and to solve the above mentioned shortcomings and pain points of prior art remote controlling of mouse cursor functions of a computer device.

According to the present invention this problem is solved by providing a method for remote controlling of mouse cursor functions of a computer device having the features of claim 1, a system for remote controlling of mouse cursor functions of a computer device having the features of claim 6, and a computer program product for remote controlling of mouse cursor functions of a computer device having the features of claim 14. Advantageous embodiments of the present invention are mentioned in the subclaims.

Accordingly, in an embodiment of the present invention a method for remote controlling of mouse cursor functions of a computer device comprises: Tracking movement of a handheld pointing device in a three dimensional monitoring space based on a directional carrier sent by the handheld pointing device; modulating the directional carrier with a pulse pattern based on a corresponding manual operation action at the handheld pointing device; converting the tracked movement of the handheld pointing device in corresponding movement information; converting the movement information of the handheld pointing device in valid desktop coordinates for the computer device and moving the mouse cursor to these coordinates; demodulating the directional carrier and evaluating the pulse pattern in order to determine a corresponding manual operating action at the handheld pointing device; and taking corresponding action if a defined manual operating action at the handheld pointing device is determined.

In further embodiments of the present invention, the defined manual operating action at the handheld pointing device comprises pushing a first button on the handheld pointing device and/or pressing and holding the first button during movement of the handheld pointing device and/or pushing a second button on the handheld pointing device and/or pressing and holding the second button during movement of the handheld pointing device.

In further embodiments of the present invention, a first pulse pattern comprises a pulse signal with a first on-time and a first off-time; and wherein a second pulse pattern comprises a pulse signal with a second on-time and a second off-time.

In further embodiments of the present invention, pulse transitions during a defined first time frame comprising a first length are counted to evaluate a corresponding pulse pattern.

In further embodiments of the present invention, the first time frame comprises a number of time blocks having equal length, wherein a prior time frame is deleted if a new time frame is recorded.

In another embodiment of the present invention, a system for remote controlling of mouse cursor functions of a computer device, comprises: A handheld pointing device comprising at least one button, at least one transmitting device and a first controller; a locating device comprising at least one receiving device, and a second controller; and a computer comprising a third controller and a graphical display. The locating device is tracking movement of the handheld pointing device in a three dimensional monitoring space based on a directional carrier sent by the at least one transmitting device of the handheld pointing device. The first controller modulates the directional carrier with a pulse pattern based on a corresponding manual operation action at the handheld pointing device. The second controller converts the tracked movement of the handheld pointing device in corresponding movement information, which are converted in valid desktop coordinates for the computer device, demodulates the directional carrier and evaluates the pulse pattern in order to determine a corresponding manual operating action at the handheld pointing device. Further the third controller moves the mouse cursor on the graphical display based on the valid desktop coordinates; and takes corresponding action if a defined manual operating action at the handheld pointing device is determined.

In further embodiments of the present invention, the handheld pointing device comprises at least one infrared light emitting diode as transmitting device; and the locating device is developed as infrared camera comprising at least one infrared image sensor and/or at least one image sensor with an infrared filter as receiving device.

In further embodiments of the present invention, the second controller of the locating device and/or the third controller of the computer device convert the movement information in valid desktop coordinates to display mouse cursor movement on the graphical display.

In further embodiments of the present invention, the second controller of the locating device and/or the third controller of the computer device determine a corresponding manual operating action at the handheld pointing device based on the evaluated pulse pattern.

In further embodiments of the present invention, a wireless communication connection between the second controller of the locating device and the third controller of the computer device is established as Bluetooth connection using a first interface unit and a second interface unit.

In further embodiments of the present invention, the handheld pointing device is constructed as glove.

In further embodiments of the present invention, the first controller modulates the directional carrier with a first pulse pattern if the first button on the handheld pointing device is pushed, and modulates the directional carrier repetitively with the first pulse pattern if the first button is pressed and hold during movement of the handheld pointing device.

In further embodiments of the present invention, the first controller modulates the directional carrier with a second pulse pattern if the second button on the handheld pointing device is pushed, and modulates the directional carrier repetitively with the second pulse pattern, if the second button is pressed and hold during movement of the handheld pointing device.

In another embodiment of the present invention, a data processing program for execution in a data processing system comprises software code portions for performing a method for remote controlling of mouse cursor functions of a computer device when the program is run on the data processing system.

In yet another embodiment of the present invention, a computer program product stored on a computer-usable medium, comprises computer-readable program means for causing a computer to perform a method for remote controlling of mouse cursor functions of a computer device when the program is run on the computer.

An idea of the present invention is to use modulation of a directional carrier with assigned pulse patterns to transmit manual operating actions at the handheld pointing device to the computer device, wherein the directional carrier is used to track movement of the handheld pointing device by a locating device.

All in all, embodiments of the present invention may use any infrared light emitting diode (LED) with pulse controller, for example, wherein pulsing speed can be checked easily. Further, embodiments of the present invention allow a user to stand freely in a room and to control all mouse features with one hand. Embodiments of the present invention improve remote presentations, are easy to set up and offer a low cost solution for remote presentations enabling movement of the mouse pointer, left clicking, right clicking, and dragging, i.e. the left or right mouse button is pressed and the mouse pointer is moved.

Figure 1:
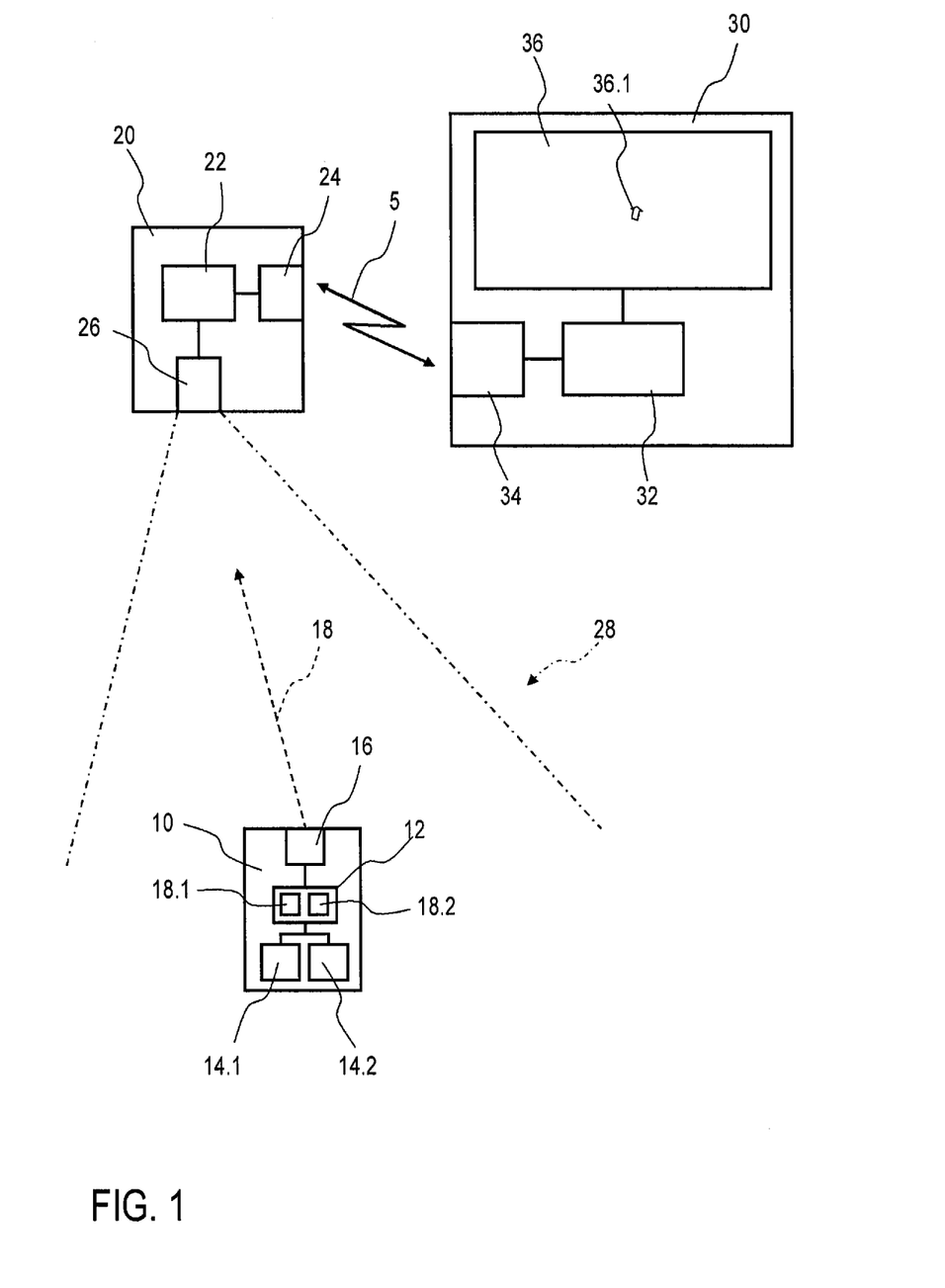
FIG. 1 is a schematic block diagram of a system for remote controlling of mouse cursor functions of a computer device, in accordance with an embodiment of the present invention.

FIG. 1 shows a system for remote controlling of mouse cursor functions 1 of a computer device 30, in accordance with an embodiment of the present invention.

Referring to FIG. 1, the shown embodiment of the present invention employs a system for remote controlling of mouse cursor functions 1 of a computer device 30. The system 1 comprises a handheld pointing device 10 comprising a left push button 14.1 and right push button 14.2, a transmitting device 16 and a first controller 12; a locating device 20 comprising a receiving device 26, and a second controller 22; and the computer device 30 comprising a third controller 32 and a graphical display 36. The locating device 20 is tracking movement of the handheld pointing device 10 in a three dimensional monitoring space 28 based on a directional carrier 18 sent by the at least one transmitting device 16 of the handheld pointing device 10. The first controller 12 of the handheld pointing device 10 modulates the directional carrier 18 with a pulse pattern 18.1, 18.2 based on a corresponding manual operation action at the handheld pointing device 10. The second controller 22 of the locating device 20 converts the tracked movement of the handheld pointing device 10 in corresponding movement information, which are converted in valid desktop coordinates for the computer device 30, demodulates the directional carrier 18 and evaluates the pulse pattern 18.1, 18.2 in order to determine a corresponding manual operating action at the handheld pointing device 10. The third controller 32 of the computer device 30 moves a mouse cursor 36.1 on the graphical display 36 based on the valid desktop coordinates; and takes corresponding action if a defined manual operating action at said handheld pointing device 10 is determined based on the evaluated pulse pattern 18.1, 18.2. The handheld pointing device 10 may be constructed as glove, for example.

In the shown embodiment of the present invention, the system for remote controlling of mouse cursor functions 1 comprises an intelligent mobile infrared light emitting diode (IR-LED) device as handheld pointing device 10 and an infrared (IR) camera as locating device 20. The IR camera 20 is positioned near the presentation display 36 of the computer device 30, facing in the direction of the user holding the IR-LED device 10. The IR-LED device 10 comprises at least one infrared light emitting diode (IR LED) as transmitting device 16. Movement of this IR LED 16 is tracked by the IR camera 20, which comprises at least one infrared image sensor and/or at least one image sensor with an infrared filter as receiving device 26. The locating device 20 then sends the movement information to the computer device 30 using a wireless communication connection 5 between the second controller 22 of the locating device 20 and the third controller 32 of the computer device 30. Preferably the wireless communication connection 5 is established as Bluetooth connection using a first interface unit 24 and a second interface unit 34. Additionally, information about manual operating action of the handheld pointing device 10 is encoded via a pulsing algorithm, which switches the IR LED 16 on and off according to certain pulse patterns 18.1, 18.2.

Figure 2:
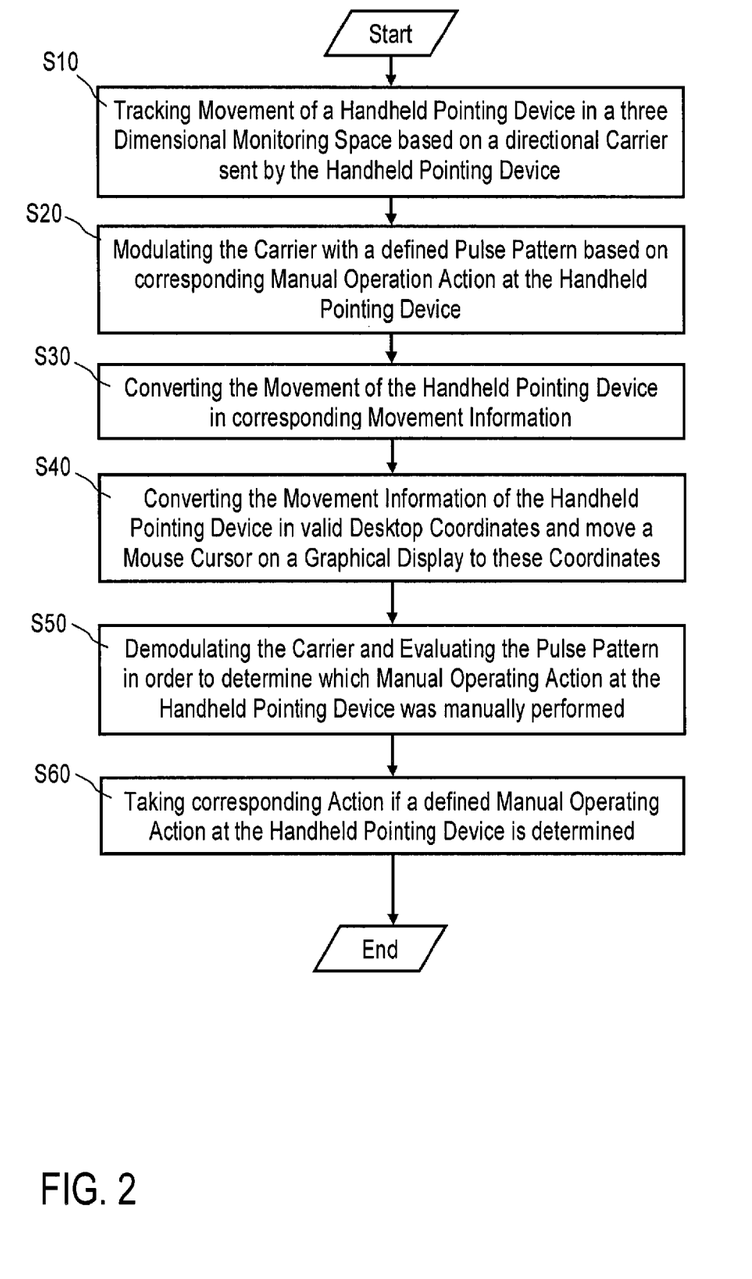
FIG. 2 is a schematic flow diagram of a method for remote controlling of mouse cursor functions of a computer device, in accordance with an embodiment of the present invention.

FIG. 2 shows a method for remote controlling of mouse cursor functions of a computer device 30, in accordance with an embodiment of the present invention.

Referring to FIG. 2, the shown embodiment of the present invention employs a method for remote controlling of mouse cursor functions of the computer device 30. In a step S10, movement of the handheld pointing device 10 in the three dimensional monitoring space 28 is tracked, based on the directional carrier 18 sent by the handheld pointing device 10. In step S20, the directional carrier 18 is modulated with a defined pulse pattern 18.1, 18.2 based on a corresponding manual operation action at the handheld pointing device 10. In step S30, the tracked movement of the handheld pointing device 10 is converted in corresponding movement information. In step S40 the movement information of the handheld pointing device 10 is converted in valid desktop coordinates for the computer device 30 and the mouse cursor 36.1 is moved to these coordinates. In step S50 the directional carrier 18 is demodulated and the pulse pattern 18.1, 18.2 is evaluated in order to determine a corresponding manual operating action at the handheld pointing device 10. In step S60, corresponding action is taken, if a defined manual operating action at the handheld pointing device 10 is determined.

Referring to FIGS. 1 and 2, software used by the third controller 32 of the computer device 30 consists of two parts, the first of which (hereafter called connector) is responsible for establishing a connection to the IR camera 20 and filtering the incoming information. The second one (hereafter called actor) receives LED information of the first software part, evaluates it and takes appropriate actions.

During system operation the computer device 30 establishes the Bluetooth connection 5 to the IR camera 20 and data is received. As the IR camera 20 tracks the movement of the IR-LED device 10, the connector receives this movement information, formats the data for easier reading and then sends the data to the actor, excluding unnecessary overhead. The actor communicates with the connector and receives the coordinate data. The actor converts the camera specific coordinates into valid desktop coordinates including stretching to fit other resolutions. The actor then moves the mouse cursor 36.1 on the graphical display 36 to these coordinates. Further the connector evaluates the pulsing of the IR LED 16 in order to determine which manual operating action was taken at the handheld pointing device 10 and transmits the manual operating information to the actor. When a manual operating action is determined, the actor takes the corresponding action.

In the shown embodiment, the third controller 32 of the computer device 30 converts the movement information in valid desktop coordinates to display mouse cursor movement on the graphical display 36 and determines a corresponding manual operating action at the handheld pointing device 10 based on the evaluated pulse pattern 18.1. In an alternative embodiment, not shown, the second controller 22 of the locating device 20 converts the movement information in valid desktop coordinates to display mouse cursor movement on the graphical display 36 and determines a corresponding manual operating action at the handheld pointing device 10 based on the evaluated pulse pattern 18.1. In a further alternative embodiment, not shown, the third controller 32 of the computer device 30 converts the movement information in valid desktop coordinates to display mouse cursor movement on the graphical display 36; and the second controller 22 of the locating device 20 determines a corresponding manual operating action at the handheld pointing device 10 based on the evaluated pulse pattern 18.1.

The manual operating actions like left or right mouse click are transmitted from the IR-LED device 10 to the IR camera 20 via pulsing at different frequencies. For example, the handheld pointing device 10 device has different states:
1. The IR LED 16 is always on, i.e. the IR-LED device 10 is moved, but no click action is performed.
2. The IR LED 16 pulses with a first pulse pattern 18.1, i.e. 15 ms on, 15 ms off, for a given number of cycles, e.g. for two cycles, representing a click of the left push button 14.1.
3. The IR LED 16 pulses with the first pulse pattern 18.1, i.e. 15 ms on, 15 ms off, as long as the left push button 14.1 is pressed, representing pressing and holding of the left push button 14.1 of the IR-LED device 10.
4. The IR LED 16 pulses with a second pulse pattern 18.2, i.e. 35 ms on, 15 ms off, for a given number of cycles, e.g. for two cycles, representing a click of the right push button 14.2.
5. The IR LED 16 pulses with the second pulse pattern 18.2, i.e. 35 ms on, 15 ms off, as long as the right push button 14.2 is pressed, representing pressing and holding of the right push button 14.2 of the IR-LED device 10.

To recognize the state of the IR LED 16, in a specific time frame TF, e.g. a 100 ms time frame, all transitions 18.3 of the pulse patterns 18.1, 18.2, i.e. on/off changes of the IR LED 16 are recorded and summed up.

That time frame TF consists of blocks TB1 to TB5 of a specific time, for example 20 ms. If a new time frame TF is recorded, the last time frame TF is deleted. In the shown embodiment for every length of a time block TB1 to TB5, i.e. 20 ms, a new time frame TF is recorded. If the sum of all transitions 18.3 in a whole time frame TF is above a certain threshold value or in-between two threshold values, an action like the click of the left push button 14.1 or the click of the right push button 14.2 is fired. In order to correct errors during the recognition, a state of the IR LED 16 is only accepted if the system recognizes this state for more than one time frame TF. As explained above, in the shown embodiment the state of the IR LED 16 is checked every 20 ms. This is done, because the timing of the data collected by the IR camera 20 is not precise. For example, if the IR LED 16 pulses with 15 ms on/15 ms off, the IR camera 20 will recognize the following intervals: 15 ms, 10 ms, 28 ms, 16 ms, 11 ms, 34 ms, for example. Therefore it is not easily possible to use a binary encoding of the data using the time for differentiating between zero and one. By recognizing the state of the IR LED 16 in certain time intervals, it is possible do recognize left and right clicks precisely.

The timing of 15 ms on-time and 15 ms off-time is chosen, because the 15 ms time interval is the shortest interval a cheap locating device 20 can recognize. For the clicks of the right push button 14.2 the longer on-time and shorter off-time is chosen in order to have as much position information as possible. If the IR LED 16 is turned off, it is not possible to recognize movement of the IR-LED device 10 and therefore the mouse cursor 36.1 cannot be moved on the graphical display 36. Turning the IR LED 16 off for more than 15 ms may lead to juddering.

Figure 3:
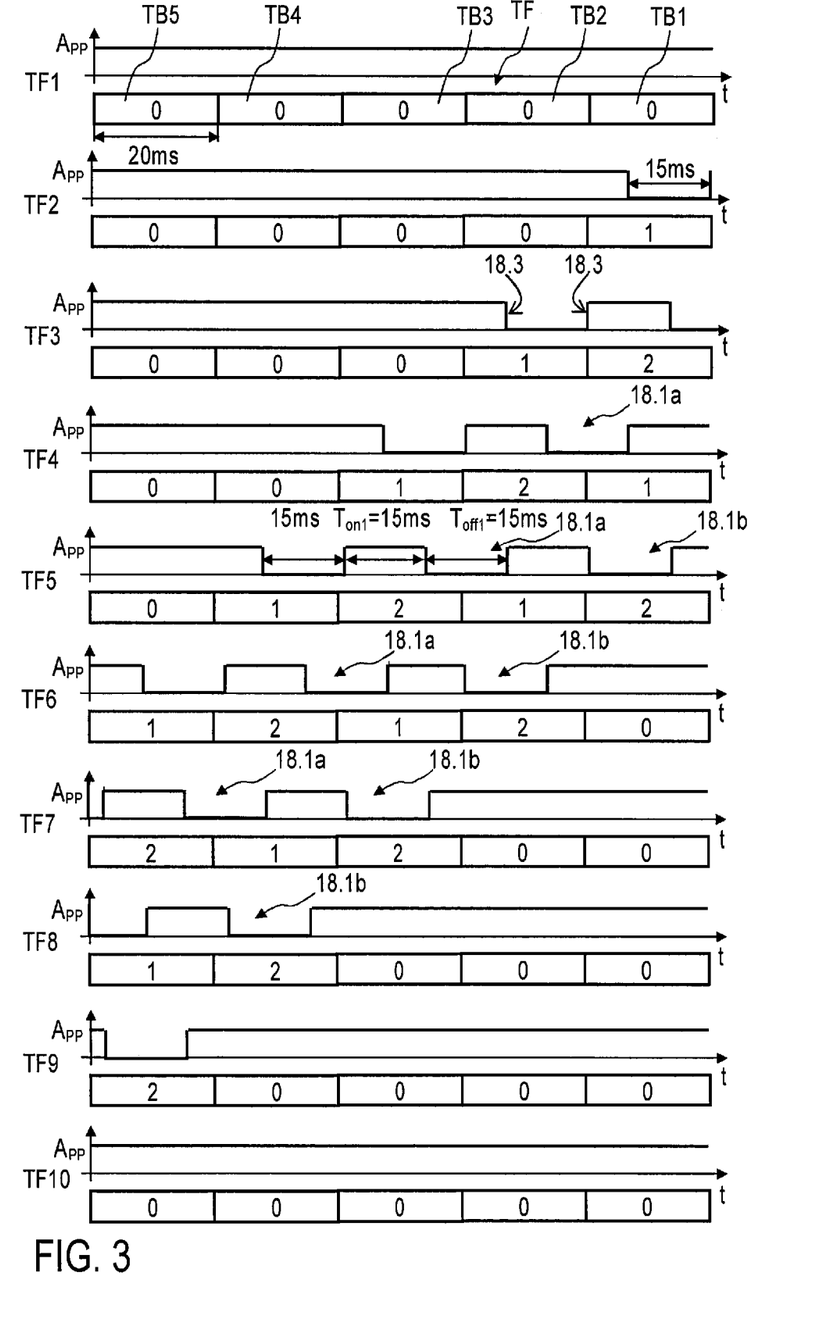
FIG. 3 are timing diagrams showing waveforms of first pulse patterns representing a first manual operating action at a handheld pointing device shown in FIG. 1, in accordance with an embodiment of the present invention.
Figure 4:
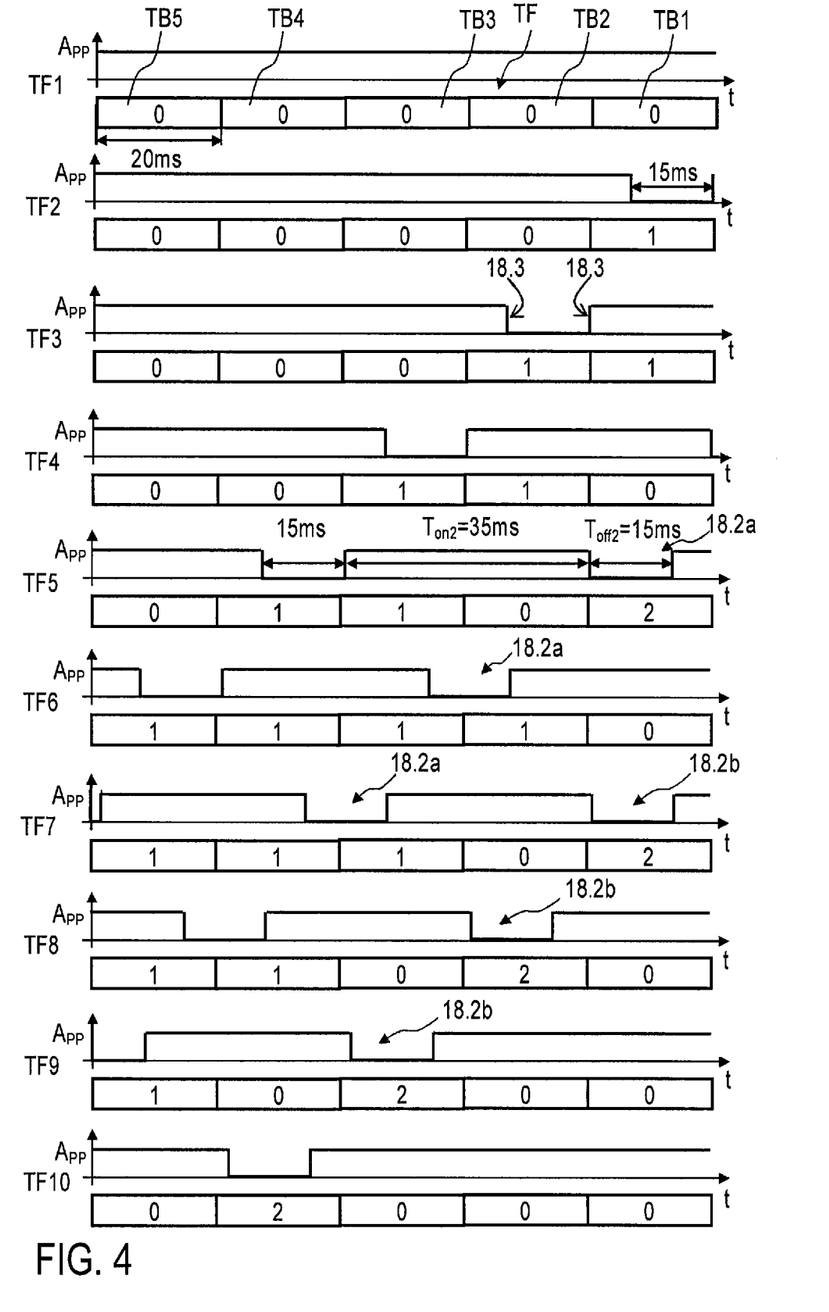
FIG. 4 are timing diagrams showing waveforms of second pulse patterns representing a second manual operating action at the handheld pointing device shown in FIG. 1, in accordance with an embodiment of the present invention.

FIG. 3 shows waveforms of first pulse patterns 18.1$a$, 18.1$b$, representing a first manual operating action at the handheld pointing device 10 shown in FIG. 1, i.e. a click of the left push button 14.1, in accordance with an embodiment of the present invention; and FIG. 4 shows waveforms of second pulse patterns 18.2$a$, 18.2$b$, representing a second manual operating action at the handheld pointing device 10 shown in FIG. 1, i.e. a click of the right push button 14.2, in accordance with an embodiment of the present invention.

Referring to FIG. 3, the example shows ten consecutive time frames TF recorded every 20 ms representing a click of the left push button 14.1. In every timing diagram, $A_{pp}$ represents the amplitude of the pulse signal generated by the first controller 12 of the IR-LED device 10 for modulating the directional carrier 18 generated by the IR LED 16. The five boxes TB1 to TB5 represent an input buffer of the IR camera 20. In this example a valid right click state of the IR-LED device 10 must be present for three consecutive time frames TF to be accepted, and a valid left click state of the IR-LED device 10 must be present for two consecutive time frames TF to be accepted. Referring to a first time frame TF1, the sum of recognized transitions 18.3 of the pulse signal is zero, so there is no further action. Referring to a second time frame TF2, the sum of recognized transitions 18.3 of the pulse signal is one, so there is no further action. Referring to a third time frame TF3, the sum of recognized transitions 18.3 of the pulse pattern is three, so there is no further action. Referring to a fourth time frame TF4, the sum of recognized transitions 18.3 of the pulse pattern is four, so a right click state is assumed and the system 1 waits for more information. Referring to a fifth time frame TF5, the sum of recognized transitions 18.3 of the pulse pattern is six, so a left click state is assumed and the system 1 waits for more information. Referring to a sixth time frame TF6, the sum of recognized transitions 18.3 of the pulse pattern is again six, so the left click state is recognized and the system 1 fires a left push button 14.1 down action. Referring to a seventh time frame TF7, the sum of recognized transitions 18.3 of the pulse pattern is five, so a right click state is assumed, but the left push button 14.1 is down, and the system 1 waits for more information. Referring to an eighth time frame TF8, the sum of recognized transitions 18.3 of the pulse pattern is three, so a the left push button 14.1 is released, and the system 1 fires a corresponding left push button 14.1 release action. Referring to a ninth time frame TF9, the sum of recognized transitions 18.3 of the pulse pattern is two, so there is no further action. Referring to a tenth time frame TF10, the sum of recognized transitions 18.3 of the pulse pattern is zero, so there is no further action.

Referring to FIG. 4, the example shows ten consecutive time frames TF recorded every 20 ms representing a click of the right push button 14.2. In every timing diagram, $A_{pp}$ represents the amplitude of the pulse signal generated by the first controller 12 of the IR-LED device 10 for modulating the directional carrier 18 generated by the IR LED 16. The five boxes TB1 to TB5 represent an input buffer of the IR camera 20. In this example a valid right click state of the IR-LED device 10 must be present for three consecutive time frames TF to be accepted, and a valid left click state of the IR-LED device 10 must be present for two consecutive time frames TF to be accepted. Referring to a first time frame TF1, the sum of recognized transitions 18.3 of the pulse signal is zero, so there is no further action. Referring to a second time frame TF2, the sum of recognized transitions 18.3 of the pulse signal is one, so there is no further action. Referring to a third time frame TF3, the sum of recognized transitions 18.3 of the pulse pattern is two, so there is no further action. Referring to a fourth time frame TF4, the sum of recognized transitions 18.3 of the pulse pattern is two, so there is no further action. Referring to a fifth time frame TF5, the sum of recognized transitions 18.3 of the pulse pattern is four, so a right click state is assumed and the system 1 waits for more information. Referring to a sixth time frame TF6, the sum of recognized transitions 18.3 of the pulse pattern is four, so a right click state is assumed and the system 1 waits for more information. Referring to a seventh time frame TF7, the sum of recognized transitions 18.3 of the pulse pattern is five, so the right click state is recognized and the system 1 fires a right push button 14.2 down action. Referring to an eighth time frame TF8, the sum of recognized transitions 18.3 of the pulse pattern is four, so the right click state is assumed, the right push button 14.2 is down, and the system 1 waits for more information. Referring to a ninth time frame TF9, the sum of recognized transitions 18.3 of the pulse pattern is three, so the right push button 14.2 is released, and the system 1 fires a corresponding right push button 14.2 release action. Referring to a tenth time frame TF10, the sum of recognized transitions 18.3 of the pulse pattern is two, so there is no further action.

The inventive method for remote controlling of mouse cursor functions of a computer device can be implemented as an entirely software embodiment, or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include Compact Disc-read only memory (CD-ROM), Compact Disc-read/write (CD-R/W), and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:
1. A system for remote controlling of mouse cursor functions of a computer device, comprising:
   a handheld pointing device comprising at least one button, at least one transmitting device and a first controller;
   a locating device comprising at least one receiving device, and a second controller; and
   a computer comprising a third controller and a graphical display;
   wherein said locating device is tracking movement of said handheld pointing device in a three dimensional monitoring space based on locating, in the three dimensional space, an optical directional carrier sent by said at least one transmitting device of said handheld pointing device;
   wherein said first controller modulates said directional carrier with a pulse pattern based on a corresponding manual operation action at said handheld pointing device;
   wherein said second controller converts said tracked movement of said handheld pointing device in the three dimensional monitoring space to movement information corresponding to the movement of the handheld pointing device in the three dimensional monitoring space, which are converted into valid desktop coordinates for said computer device, demodulates said directional carrier and evaluates said pulse pattern in order to deter- mine a corresponding manual operating action at said handheld pointing device; and wherein said third controller moves a mouse cursor on said graphical display based on said valid desktop coordinates; and takes corresponding action if a defined manual operating action at said handheld pointing device is determined.

2. The system according to claim 1, wherein said handheld pointing device comprises at least one infrared light emitting diode as transmitting device; and said locating device is developed as infrared camera comprising at least one infrared image sensor or at least one image sensor with an infrared filter as receiving device.

3. The system according to claim 1, wherein said second controller of said locating device or said third controller of said computer device convert said movement information in valid desktop coordinates to display mouse cursor movement on said graphical display.

4. The system according to claim 1, wherein said second controller of said locating device or said third controller of said computer device determine a corresponding manual operating action at said handheld pointing device based on said evaluated pulse pattern.

5. The system according to claim 1, wherein a wireless communication connection between said second controller of said locating device, and said third controller of said computer device is established as Bluetooth connection using a first interface unit and a second interface unit.

6. The system according to claim 1, wherein said handheld pointing device is constructed as a glove.

7. The system according to claim 1, wherein said first controller modulates said directional carrier with a first pulse pattern if said first button on said handheld pointing device is pushed, and modulates said directional carrier repetitively with said first pulse pattern if said first button is pressed and hold during movement of said handheld pointing device.

8. The system according to claim 1, wherein said first controller modulates said directional carrier with a second pulse pattern if said second button on said handheld pointing device is pushed, and modulates said directional carrier repetitively with said second pulse pattern, if said second button is pressed and hold during movement of said handheld pointing device.

9. A computer program product for remote controlling of mouse cursor functions of a computer device, the computer program product comprising:

a non-transitory computer-readable storage medium readable by a processor and storing instructions for execution by the processor for performing a method comprising:

tracking movement of a handheld pointing device in a three dimensional monitoring space based on locating, in the three dimensional space, an optical directional carrier sent by said handheld pointing device;

modulating said directional carrier with a pulse pattern based on a corresponding manual operation action at said handheld pointing device;

converting said tracked movement of said handheld pointing device in the three dimensional monitoring space to movement information corresponding to the movement of the handheld pointing device in the three dimensional monitoring space;

converting said movement information of said handheld pointing device in valid desktop coordinates for said computer device and moving a mouse cursor to these coordinates;

demodulating said directional carrier and evaluating said pulse pattern in order to determine a corresponding manual operating action at said handheld pointing device; and taking corresponding action if a defined manual operating action at said handheld pointing device is determined.

10. A method for remote controlling of mouse cursor functions of a computer device, the method comprising:

tracking movement of a handheld pointing device in a three dimensional monitoring space based on locating, in the three dimensional space, an optical directional carrier sent by said handheld pointing device;

modulating said directional carrier with a pulse pattern based on a corresponding manual operation action at said handheld pointing device;

converting said tracked movement of said handheld pointing device in the three dimensional monitoring space to movement information corresponding to the movement of the handheld pointing device in the three dimensional monitoring space;

converting said movement information of said handheld pointing device in valid desktop coordinates for said computer device and moving a mouse cursor to these coordinates;

demodulating said directional carrier and evaluating said pulse pattern in order to determine a corresponding manual operating action at said handheld pointing device; and taking corresponding action if a defined manual operating action at said handheld pointing device is determined.

11. The method according to claim 10, wherein said defined manual operating action at said handheld pointing device comprises at least one of the following: pushing a first button on said handheld pointing device, pressing and holding said first button during movement of said handheld pointing device, pushing a second button on said handheld pointing device, and pressing and holding said second button during movement of said handheld pointing device.

12. The method according to claim 10, wherein a first pulse pattern comprises a pulse signal with a first on-time and a first off-time, and wherein a second pulse pattern comprises a pulse signal with a second on-time and a second off-time.

13. The method according to claim 10, wherein pulse transitions during a defined first time frame comprising a first length are counted to evaluate a corresponding pulse pattern.

14. The method according to claim 13, wherein said first time frame comprises a number of time blocks having equal length, wherein a prior time frame is deleted if a new time frame is recorded.

* * * * *